(12) United States Patent
Ozozlu et al.

(10) Patent No.: US 12,089,238 B1
(45) Date of Patent: *Sep. 10, 2024

(54) METHOD AND SYSTEM FOR CONTROLLING INTERFERENCE BETWEEN ACCESS NODES OPERATING ON ADJACENT TDD CARRIERS WITH DIFFERENT TDD CONFIGURATIONS

(71) Applicant: T-Mobile USA, Inc., Bellevue, WA (US)

(72) Inventors: Akin Ozozlu, Mclean, VA (US); Nagi Mansour, Arlington, VA (US); Norman M. Alam, Chantilly, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/823,876

(22) Filed: Aug. 31, 2022

Related U.S. Application Data (63) Continuation of application No. 17/248,800, filed on Feb. 8, 2021, now Pat. No. 11,464,021, which is a continuation of application No. 16/530,495, filed on Aug. 2, 2019, now Pat. No. 10,966,213.

(51) Int. Cl.
| | |
|---|---|
| *H04W 72/541* | (2023.01) |
| *H04L 5/00* | (2006.01) |
| *H04L 5/14* | (2006.01) |
| *H04W 72/044* | (2023.01) |

(52) U.S. Cl.
CPC ........ *H04W 72/541* (2023.01); *H04L 5/0082* (2013.01); *H04L 5/1469* (2013.01); *H04W 72/0473* (2013.01)

(58) Field of Classification Search
CPC .......... H04W 72/541; H04W 72/0473; H04W 52/143; H04W 52/243; H04W 52/38; H04L 5/0053; H04L 5/0058; H04L 5/0062; H04L 5/0078; H04L 5/0082; H04L 5/1469; H04L 5/001
See application file for complete search history.

(56) References Cited

U.S. PATENT DOCUMENTS

| | | |
|---|---|---|
| 2012/0082070 A1 | 4/2012 | Hart et al. |
| 2014/0022961 A1 | 1/2014 | Park et al. |
| 2014/0044092 A1 | 2/2014 | Guan et al. |

(Continued)

FOREIGN PATENT DOCUMENTS

WO    WO2018/031746    2/2018

*Primary Examiner* — Peter Chen
(74) *Attorney, Agent, or Firm* — Lee & Hayes, P.C.

(57) ABSTRACT

A first access node that is operating on a first TDD carrier having a first TDD configuration will determine that a second TDD carrier on which a proximate second access node is operating has a different, second TDD configuration, such that there is at least one time interval in which the first TDD carrier is downlink concurrently with the second TDD carrier being uplink. In response to at least this determination, the first access node will then transition to a mode in which, during the time interval, the first access node will operate with reduced transmission power on a frequency portion of the first TDD carrier that is closest in frequency to the second TDD carrier. Further, the first access node could allocate the lower-transmission-power frequency portion for use in transmission to served devices deemed to be in at least predefined threshold high quality coverage of the first access node.

20 Claims, 6 Drawing Sheets

(56) References Cited

U.S. PATENT DOCUMENTS

| | | |
|---|---|---|
| 2014/0177485 A1 | 6/2014 | Wang et al. |
| 2016/0044638 A1 | 2/2016 | Gao et al. |
| 2019/0089502 A1 | 3/2019 | Yi et al. |

METHOD AND SYSTEM FOR CONTROLLING INTERFERENCE BETWEEN ACCESS NODES OPERATING ON ADJACENT TDD CARRIERS WITH DIFFERENT TDD CONFIGURATIONS

REFERENCE TO RELATED APPLICATIONS

This is a continuation of U.S. patent application Ser. No. 17/248,800, filed Feb. 8, 2021, now U.S. Pat. No. 11,464,021 issued Oct. 4, 2022, which is a continuation of U.S. patent application Ser. No. 16/530,495, filed Aug. 2, 2019, now U.S. Pat. No. 10,966,213 issued Mar. 30, 2021, the entirety of each which is hereby incorporated by reference.

BACKGROUND

A typical cellular wireless system includes a number of access nodes configured to provide wireless coverage areas in which to serve user equipment devices (UEs) such as cell phones, tablet computers, tracking devices, embedded wireless modules, and other wirelessly equipped devices (whether or not user operated). In turn, each access node could sit as a node on a core access network that includes entities such as a network controller and a gateway system providing connectivity with one or more external transport networks such as the Public Switched Telephone Network (PSTN) and/or the Internet. With this arrangement, a UE within coverage of the system could engage in air interface communication with an access node and could thereby communicate via the access node with various remote network entities or with other UEs served by the access node.

Such a system could operate in accordance with a particular radio access technology, with air-interface communications from the access nodes to UEs defining a downlink or forward link and air-interface communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the radio access technology, each access node could provide service on one or more carriers, with each carrier spanning one or more radio-frequency (RF) channels for carrying communications wirelessly between the access node and UEs. In particular each carrier could be frequency division duplex (FDD), defining separate frequency channels for downlink and uplink use, or time division duplex (TDD), defining a single frequency channel multiplexed over time between downlink and uplink use.

Each such frequency channel could be characterized by its position and width in RF spectrum, such as by a designated center frequency and bandwidth. Further, each channel could be structured to define various physical resources for carrying communications. For instance, under an example radio access technology, each channel could be divided over time into frames, subframes, and timeslots, and symbol segments, and could be divided over frequency into subcarriers. As a result, each channel could define an array of time-frequency resource elements in which subcarriers can be modulated to carry data communications. Further, within each subframe and timeslot, these resource elements could be divided into groups defining physical resource blocks (PRBs) that can be allocated to carry data on an as-needed basis.

Overview

When an access node operates on a TDD carrier, the carrier could be structured with a particular TDD configuration (frame configuration) defining a sequence of equal-duration subframes and establishing which subframes are for downlink use and which subframes are for uplink use. Further, the TDD configuration may designate certain subframes as special subframes to help facilitate transition from downlink to uplink operation. Thus, a representative TDD configuration could establish for each subframe per frame whether the subframe is a downlink subframe (D), an uplink subframe (U), or a special subframe (S).

Various TDD configurations could be feasible. In LTE, for instance, the air interface on a TDD carrier defines a continuum of 10-millisecond frames, each divided into ten 1-millisecond subframes, and LTE defines seven standard TDD configurations as set forth in Table 1.

TABLE 1

| TDD Configuration | Subframe Number (0-9) | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Non-standard implementations and/or other radio access technologies may define other frame structures and other TDD configurations as well.

In practice, an access node that operates with a carrier having any such TDD configuration could broadcast on the carrier a system information message that specifies the carrier's TDD configuration, so that UEs within coverage of the access node could determine the TDD configuration and operate accordingly. For instance, an access node could broadcast a System Information Block (SIB) message in subframe 0 of each frame and could include in the SIB message a specification of the carrier's TDD configuration, such as a frame configuration (FC) number. Thus, a UE that is within coverage of the access node on that carrier could read that broadcast SIB message to determine the TDD configuration of the cell. Alternatively, a UE might determine the TDD configuration of a carrier in other ways, such as by monitoring to determine the subframes in which the access node transmits per frame.

The TDD configuration on an access node's carrier could be statically set by engineering design or the like. Or alternatively, the access node could dynamically vary the TDD configuration of the carrier to help accommodate varying traffic profiles. For example, at times when the access node serves heavier downlink traffic, the access node may use a more downlink-centric TDD configuration such as FC2, FC4, or FC5. Whereas, at times when the access node serves heavier uplink traffic, the access node may use a more uplink-centric TDD configuration such as FC0, FC1, or FC6.

One technical problem that can arise in some TDD implementations is that two access nodes positioned physically close to each other (e.g., adjacent or collocated) may operate on respective carriers that are close in frequency to each other but that use different TDD configurations than each other. In that situation, there would likely be some time intervals (e.g., subframes) that are downlink on one access node's carrier but are uplink on the other access node's carrier. And in each such time interval, downlink transmission by one of the access nodes could interfere with uplink reception by the other access node.

Although the two access nodes operate on different carriers than each other, if those carriers are close enough in frequency to each other, spurious emission resulting from one access node's downlink transmission (e.g., due to imperfect filter roll-off, intermodulation distortion, and/or other factors) could extend into the adjacent frequency range of the other access node's carrier. And if that happens during an uplink time interval on the other access node's carrier, that spurious emission could interfere with the other access node's reception of communications from served UEs.

This problem situation could arise in various scenarios.

As one example, a cellular wireless service provider might operate a cell site with collocated access nodes that are configured to provide service on different respective TDD carriers that are close to each other in frequency. Without limitation, one such implementation could be where the cell site includes both a 4G LTE access node (evolved Node-B (eNB)) operating on a first TDD carrier and a 5G NR access node (next-generation Node-B (gNB)) operating on a second TDD carrier that is close in frequency to the first TDD carrier and has a different TDD configuration than the first TDD carrier.

As another example, a cellular wireless service provider might operate two separate but physically close cell sites, one with an access node operating on a first TDD carrier and another with an access node operating on a second TDD carrier that is similarly close in frequency to the first TDD carrier but has a different TDD configuration. And as still another example, two cellular wireless service providers (e.g., two competitor commercial providers, or perhaps a commercial provider and a public-safety provider) might operate respective nearby access nodes, one operating on a first TDD carrier and the other operating on a second TDD carrier also close in frequency to the first TDD carrier and having a different TDD configuration.

Disclosed herein is a method and system to help address this problem. In accordance with the disclosure, a first access node that is operating on a first TDD carrier having a first TDD configuration will determine that a second TDD carrier on which a proximate second access node is operating has a different, second TDD configuration, such that there is at least one time interval (e.g., subframe) in which, concurrently, the first TDD carrier is downlink and the second TDD carrier is uplink. In response to at least this determination, the first access node will then transition to a mode in which, during the time interval, the first access node will operate with reduced transmission power on a frequency portion of the first TDD carrier that is closest in frequency to the second TDD carrier.

For instance, where the first TDD carrier is divided over frequency into PRBs within the time interval at issue and if the first access node normally transmits at a default transmission power level, the first access node could respond to the determination by transitioning to a mode in which, during the time interval, the first access node operates with reduced transmission power in certain PRBs closest in frequency to the second TDD carrier but still operates with the default (non-reduced) transmission power in the remaining PRBs of the TDD carrier that are farther away in frequency from the second carrier.

Further, in an example implementation, when the first access node has transitioned to operate in this mode, the first access node could also responsively apply a scheduling algorithm that limits allocation of the lower-power PRBs (for downlink transmission) to served UEs that are in relatively strong coverage of the first access node, as such UEs may be better able than other UEs to receive the lower-power transmissions from the first access node.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a wireless communication system having a cell site that includes a 4G eNB operating on at least one TDD carrier and a collocated 5G gNB operating on at least another TDD carrier. It should be understood, however, that the principles disclosed herein could extend to apply in other scenarios as well, such as with respect to other RATs and/or other scenarios where two access nodes are physically close enough to each other that one could receive transmission from the other and where the access nodes operate on different TDD carriers that are close enough in frequency to each other that spurious emission from one access node might extend into the frequency range of the other access node's carrier.

Further, other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processing unit executing instructions stored in non-transitory data storage, along with associated circuitry or other hardware, for instance.

Figure 1:
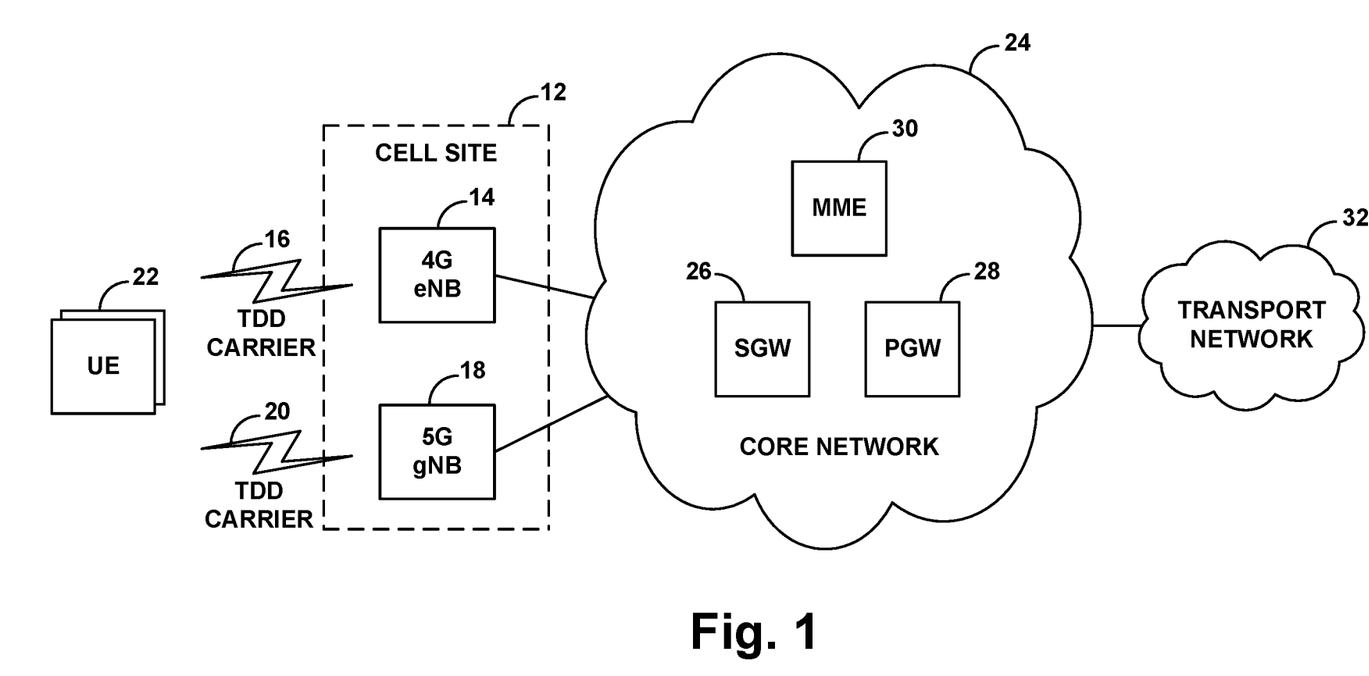
FIG. 1 is a simplified block diagram of a wireless communication system in which various disclosed features can be implemented.

FIG. 1 depicts an example cell site 12 that includes a 4G eNB 14 that is configured to provide 4G service on a 4G carrier 16, and a 5G gNB 18 that is configured to provide 5G service a 5G carrier 20. These access nodes could be collocated with each other at the cell site, possibly sharing a common antenna tower and other equipment, and could provide coverage in largely the same direction as each other, to define overlapping coverage in which UEs can receive both 4G service from the 4G eNB 14 and 5G service from the 5G gNB 18. FIG. 1 then further illustrates a number of UEs 22 positioned within coverage of the two access nodes.

In a representative implementation, carriers 16 and 20 are different respective TDD carriers, each having a respective center frequency and bandwidth in RF spectrum and thus each defining a respective range of frequency extending from a respective low-frequency end to a respective high-frequency end.

The air interface respectively on each such carrier could be configured as described above, being divided over time into frames, subframes, timeslots, and symbol time segments, and over frequency into subcarriers, thus defining an array of air-interface resource elements in which subcarriers can be modulated to carry data. And within each subframe, these resource elements could then be divided over frequency into groups defining the PRBs noted above, some or all of which the access node could be configured to allocate for use to carry data to or from served UEs on an as-needed basis.

Further, on each carrier, certain resource elements or PRBs could be reserved for special purposes. For instance, in each downlink subframe, resource elements within the first symbol time segments could be reserved to define a downlink control region for carrying downlink control signaling, resource elements in the remaining symbol time segments could be reserved to define a downlink shared-channel region for carrying scheduled data communications in PRBs, and certain resource elements distributed in frequency and time throughout the subframe could be reserved to carry a broadcast reference signal that UEs can measure to evaluate coverage quality on the carrier. And in each uplink subframe, certain PRBs could be reserved to define an uplink control region for carrying uplink control signaling, and other PRBs could be reserved to define an uplink shared-channel region for carrying scheduled data communications in PRBs. Other air-interface configurations are possible as well.

4G and 5G could also differ from each other in various ways now known or later developed. For instance, one might implement variable subcarrier spacing and the other might have fixed subcarrier spacing, one might support dynamic (flexible) TDD configuration and the other might support only static (fixed) TDD configuration, one might have different symbol time segments than the other, and/or one might make different use of MIMO technologies than the other, among other possibilities.

As further shown, the example 4G eNB and 5G gNB are each connected with a common core network 24, which could be an Evolved Packet Core (EPC) network or Next Generation Core (NGC) network for instance. In the example shown, the core network includes a serving gateway (SGW) 26, a packet data network gateway (PGW) 28, and a mobility management entity (MME) 30.

In this arrangement, the 4G eNB and 5G gNB might each have an interface with the SGW, the SGW might have an interface with the PGW, and the PGW might provide connectivity with a transport network 32. In addition, at least the 4G eNB might have an interface with the MME, and the MME might have an interface with the SGW, so that the MME could coordinate setup of bearer connections for UEs to enable the UEs to engage in packet-data communication via 4G and 5G. Further, the 4G eNB and 5G gNB may have an inter-access-node interface enabling them to engage in signaling with each other.

This example system might support UEs connecting and being served in various ways by the 4G eNB and by the 5G gNB. For example, the system might support UEs connecting initially with the 4G eNB via the 4G carrier 16 and might support then setting up of dual-connectivity for such UEs to be served concurrently by the 4G eNB via the 4G carrier 16 and the 5G gNB via the 5G carrier 20. Further, the cell site might support UEs separately connecting with and being served by the 4G eNB via the 4G carrier 16 and/or the 5G gNB via the 5G carrier 20. Other examples may be possible as well.

With this or other arrangements, a UE may thus establish an air interface connection with an access node on the access node's carrier. Further, the UE may engage in attach signaling with the MME to register for service with the network, and the MME may coordinate setup for the UE of a data bearer including access-bearer portion extending between the access node and the SGW/PGW and a radio bearer portion extending over the air between the access node and the UE.

Once the UE is connected with an access node on a carrier and is registered for service, the access node could then serve the UE with wireless packet-data communications. For instance, when the core network 24 has data to transmit to the UE, the access node could select one or more downlink PRBs of an upcoming downlink subframe for carrying the data, and in that subframe the access node could transmit to the UE a scheduling directive designating the PRB(s) and could transmit the data to the UE in the designated PRB(s). And when the UE has data to transmit to the core network, the UE could transmit a scheduling request to the access node, the access node could responsively select one or more uplink PRBs of an upcoming uplink subframe for carrying the data and could transmit to the UE in a preceding downlink subframe a scheduling directive designating the PRB(s), and the UE could then transmit the data to the access node in the designated PRB(s).

In addition, while the UE is being served by the access node on a given carrier, the UE may regularly evaluate the quality of its coverage from the access node on that carrier and may report the coverage quality for use in various ways. For example, the UE may report when the coverage strength on the carrier becomes threshold low, which might result in triggering handover of the UE to another access node. And as another example, the UE might regularly report channel quality, and the access node might use the reported channel quality as a basis to set an appropriate modulation and coding scheme for use in carrying data over the air between the access node and the UE.

As noted above, difficulty could arise with the arrangement shown in FIG. 1 if TDD carriers 16 and 20 are close enough in frequency to each other and if the carriers have different TDD configurations than each other such that a downlink time interval on one carrier exists at the same time as an uplink time interval on the other carrier. Though static or dynamic settings of either carrier's TDD configuration or of both carriers' TDD configurations, for instance, it may be the case that the 4G carrier 16 has a downlink subframe that overlaps partially or completely in time with an uplink subframe of 5G carrier 20, or vice versa.

Figure 2:
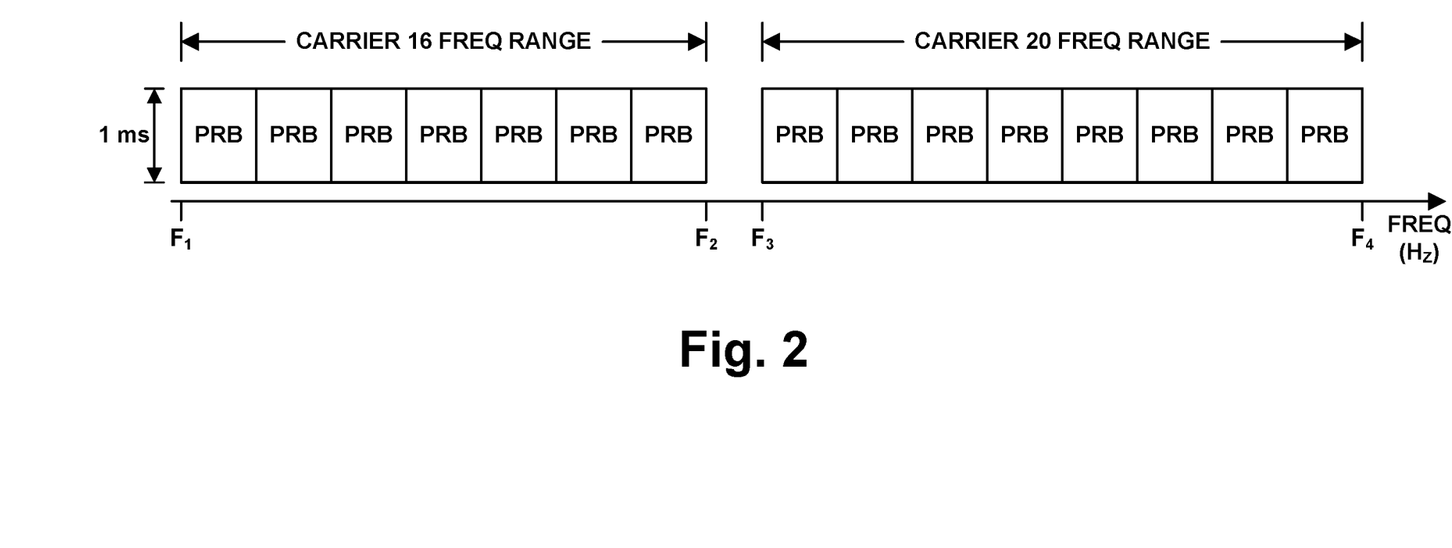
FIG. 2 is an illustration of an example time interval of two adjacent TDD carriers.

FIG. 2 illustrates this scenario by way of example, plotting time versus frequency and depicting a 1-millisecond time interval of adjacent carriers 16 and 20. As shown in this example, 4G carrier 16 has a defined frequency range extending from a low-end frequency F1 to a high-end frequency F2, and 5G carrier 20 has a defined frequency range extending from a low-end frequency F3 to a high-end frequency F4. Each of these carriers is further shown divided over its respective frequency range into example PRBs. These carriers are "adjacent" to each other in that spurious emission resulting from transmission on one carrier might extend at least somewhat into the other carrier's frequency range, even if there may be a guard band or one or more intervening carriers.

As noted above, spurious emission could result from imperfect filter roll-off, intermodulation distortion, and/or one or more other factors. For example, an access node may be equipped with an RF filter to help constrain the frequency range of its transmission to within certain licensed frequency and perhaps particularly the frequency range(s) of the carrier(s) on which the access node is configured to operate. However, the filter will likely be imperfect, passing harmonics and/or other signals outside of that range. Further, to the extent the access node processes transmissions on multiple subcarriers and/or multiple carriers, those transmissions might combine with each other to produce intermodulation products or the like that might also fall outside of the access node's operating frequency range.

Figure 3:
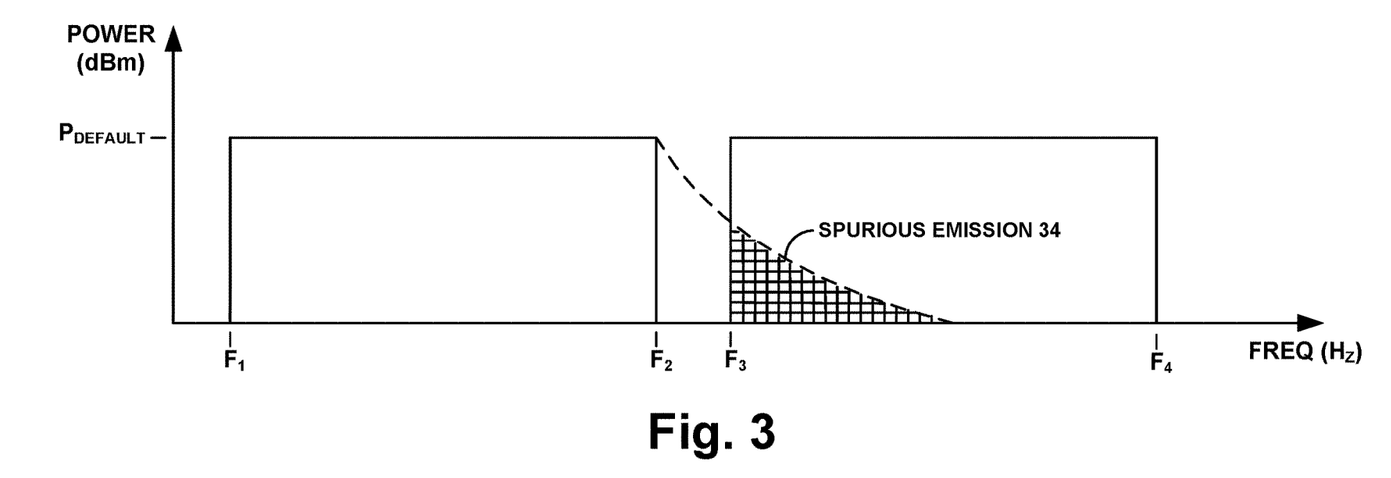
FIG. 3 is an illustration of spurious emission from one TDD carrier extending into a frequency range of another TDD carrier.

FIG. 3 illustrates how this spurious emission problem could play out between carrier's 16 and 20. In particular, FIG. 3 plots transmission power versus frequency in a scenario where carrier 16 is downlink and carrier 20 is uplink. Here, while 4G eNB 12 may have an RF filter that seeks to limit the frequency of its transmission to be no higher than the high-end frequency F2 of carrier 16, while 4G eNB 12 is transmitting with a default transmission power level $P_{default}$ on carrier 16, the 4G eNB 12 may provide spurious emission 34 in the form of a signal that decays down from power level $P_{default}$ as frequency increases.

Unfortunately, this spurious emission 34 could interfere with a concurrent effort by 5G gNB 18 to receive communications from one or more UEs on carrier 20. In particular, this emission from 4G eNB 12 could be received by 5G gNB 18 and could create difficulty for 5G gNB 18 receiving UE communications at the same time. For instance, the emission from 4G eNB 12 could reduce a signal-to-noise-plus-interference (SINR) at the receiver of 5G gNB 18, which may lead to failed reception, retransmission, and other issues.

In this example scenario, the present disclosure provides for addressing this problem by having 4G eNB 12 dynamically reduce the power of its transmission on a frequency portion of carrier 16 that is closest in frequency to adjacent carrier 20, particularly in any such time interval where carrier 16 is downlink and carrier 20 is uplink.

By way of example, 4G eNB 12 could identify a time interval when its serving carrier 16 is downlink and adjacent carrier 20 of 5G gNB 18 is uplink, and based on identifying that time interval, 4G eNB 12 could reduce its transmission power in one or more PRBs at the high end of carrier 16, while continuing to operate with its default transmission power in other PRBs of carrier 16. Namely, 4G eNB 12 could select a set of one or more such PRBs based on the PRB(s) being at the high end of carrier 16, and 4G eNB 12 could transition to a mode in which it uses a reduced transmission power $P_{reduced}$ rather than its default transmission power $P_{default}$ for transmission on the selected PRB(s), while continuing to operate with its default transmission power on PRBs of carrier 16 that are more distant in frequency from carrier 20.

4G eNB 12 could make this transmission-power adjustment selectively on a per PRB basis by dynamically controlling the gain of a power amplifier that 4G eNB 12 uses for RF transmission. For instance, the 4G eNB 12 could configure the power amplifier to amplify subcarriers in the identified PRB(s) less than subcarriers in other PRBs of carrier 16.

Figure 4:
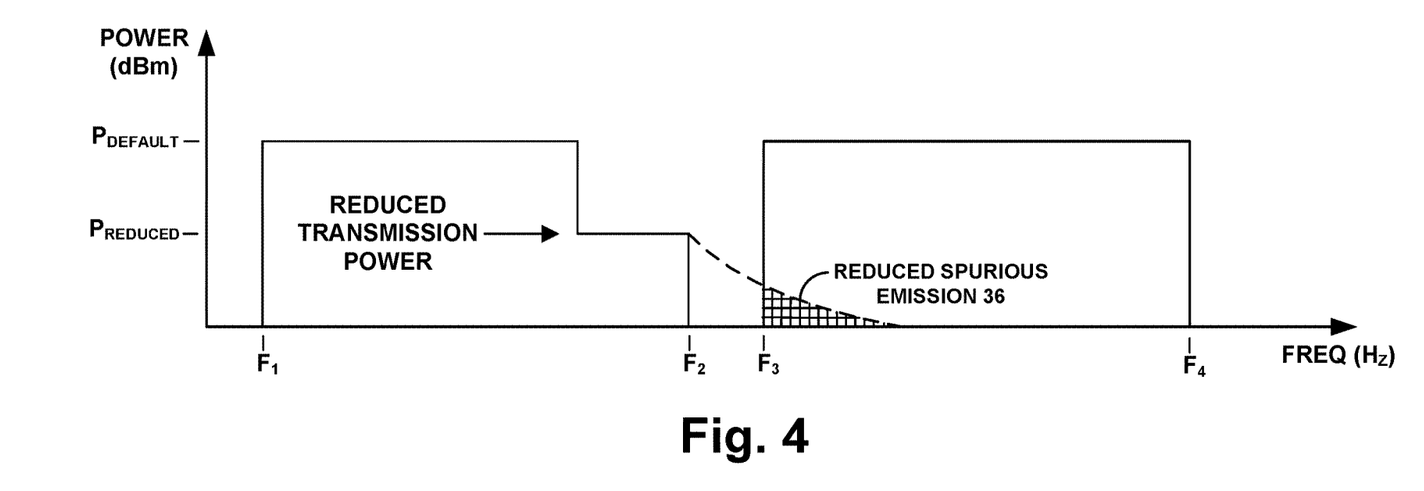
FIG. 4 is an illustration of reduced-energy spurious emission resulting from transmission with reduced power on a frequency portion closest to an adjacent TDD carrier.

FIG. 4 shows a possible impact of this power reduction on the level of spurious emission from 4G eNB 12. As shown in FIG. 4, because the transmission power on one or more PRB(s) at the high end of carrier 16 is reduced, the power level of associated spurious emission 36 is reduced, thus creating less interference if any within the frequency range of carrier 20. Optimally, this reduced interference on carrier 20 may therefore enable 5G gNB 18 to better receive and process UE transmissions on carrier 20 during the time interval at issue.

In an example implementation, the default transmission power $P_{default}$ that 4G eNB 12 uses for transmission on carrier 16 may be on the order of 43 decibel-milliwatts (dBm), and the 4G eNB 12 could reduce its transmission power on the select PRB(s) to a level that approaches that likely used for uplink transmission by UEs to 5G gNB 18, such as 26 dBm or 26 dBm for instance. By having 4G eNB 12 use a UE-like transmission power on the select PRB(s) close in frequency to carrier 20, 5G gNB 18 may be better able to withstand the resulting spurious emission.

The process described so far may assume that 4G eNB 12 knows about the time interval in which carrier 16 will be downlink and carrier 20 will be uplink and further knows that carrier 20 is close in frequency to carrier 16, carrier 20 is an operating carrier of 5G gNB 18, and 5G gNB 18 is physically close to 4G eNB 12 (e.g., that a receive antenna structure of 5G gNB 18 is close enough to a transmit antenna structure of 4G eNB 12 such that signals transmitted by 4G eNB 12 could be received by 5G gNB 18.

In practice, 4G eNB 12 might learn some or all of this information based on access-node neighbor data provisioned at 4G eNB 12 and/or otherwise accessible to 4G eNB 12 (possibly from a shared element management system (EMS) or the like). Alternatively or additionally, 4G eNB 12 could learn some of this information based on inter-access-node signaling between 4G eNB 12 and 5G gNB 18.

Through these or other mechanisms, for instance, 4G eNB 12 might learn that 5G gNB 18 is physically close and that 5G gNB 18 is operating on carrier 20, and 4G eNB could compare carrier 20 with its own operating carrier 16 to determine that the two are adjacent in frequency. Further, through similar mechanisms, 4G eNB 12 might learn the current (static or dynamically set) TDD configuration of carrier 20 on which 5G gNB is operating, and 4G could compare that TDD configuration with the current (static or dynamically set) TDD configuration of its own operating carrier 16 to identify a time interval in which carrier 16 is downlink and carrier 20 is uplink. Alternatively, 4G eNB 12 might determine the TDD configuration of carrier 20 in another manner, such as by scanning carrier 20 to determine the subframes per frame in which 5G gNB transmits, as downlink subframes.

Note also that the present process could apply with various types of time intervals. In one example, for instance, the process could apply on a subframe basis, such as across a 1-millisecond subframe in which carrier 16 is downlink and carrier 20 is uplink. And alternatively or additionally, the process the could apply with respect to a portion of a subframe, such a time interval in which carrier 12 defines a downlink portion (DwPTS) of a special subframe and/or when carrier 20 defines an uplink portion (UpPTS) of a special subframe. Still further, note that frame timing between carrier 16 and carrier 20 may or may not be perfectly synchronized. If it is not perfectly synchronized, 4G eNB 12 could engage in further signaling to more specifically identify a time interval when carrier 16 is downlink and carrier 20 is uplink, to facilitate carrying out the present process.

As further noted above, in an example implementation of the present process, when the 4G eNB 12 is operating in the mode in which it uses reduced transmission power on select PRB(s) close in frequency to carrier 20, the 4G eNB 12 could then responsively limit allocation of the lower-power PRB(s) to UEs that are in threshold good coverage of 4G eNB 12, as those UEs could be best able to receive the lower-power transmission from the 4G eNB 12.

To facilitate this for a given served UE, the 4G eNB 12 could determine based on coverage quality reports from the UE whether the UE's coverage quality is at least as high as a predefined threshold deemed to be high enough for this purpose. If so, then based at least on that determination and based on the lower-power PRB(s) being lower-power PRB(s), the 4G eNB 12 could allocate at least the lower-power PRB(s) for transmission of data to the UE. Whereas, if not, then based at least on that determination and based on the lower-power PRB(s) being lower-power PRB(s), then 4G eNB 12 could forgo allocating the lower-power PRB(s) for transmission to the UE and may instead allocate one or more other PRBs for transmission to the UE.

Figure 5:
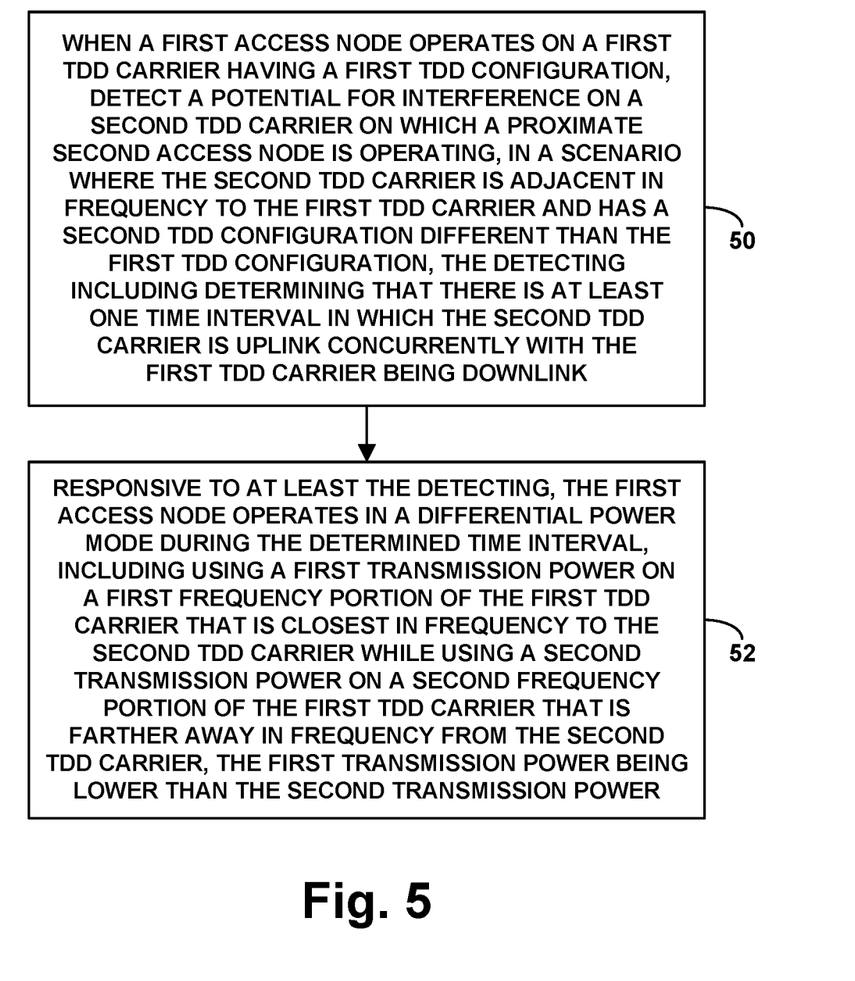
FIG. 5 is a flow chart depicting an example method in accordance with the disclosure.

FIG. 5 is a flow chart depicting a method that could be carried out in accordance with the present disclosure to help control interference between access nodes or other serving entities operating on adjacent TDD carriers with different TDD configurations. This method could be carried out by or for a first such access node, to control transmission by the first access node on a TDD carrier having a first frequency range and having a first TDD configuration that defines a first sequence of uplink and downlink time intervals (e.g., subframes and/or portions thereof, among other possibilities). For instance, in the arrangement of FIG. 1, the method could be carried out by 4G eNB 12.

As shown in FIG. 5, at block 50, the method includes detecting a potential for interference on a second TDD carrier on which a proximate second access node is operating, in a scenario where the second TDD carrier is adjacent in frequency to the first TDD carrier and has a second TDD configuration different than the first TDD configuration, the detecting including determining that there is at least one time interval in which the second TDD carrier is uplink concurrently with the first TDD carrier being downlink. At block 52, the method then includes, responsive to at least the detecting, the first access node operating in a differential power mode during the determined time interval, including using a first transmission power on a first frequency portion of the first TDD carrier that is closest in frequency to the second TDD carrier while using a second transmission power on a second frequency portion of the first TDD carrier that is farther away in frequency from the second TDD carrier, the first transmission power being lower than the second transmission power.

In line with the discussion above, this method could additionally include, responsive to at least the first access node operating in the differential power mode, the first access node allocating the first frequency portion of the first TDD carrier in the determined time interval to one or more served devices based at least on (i) the one or more served devices being in at least predefined threshold high quality coverage of the first access node and (ii) the first access node using the first, lower transmission power on the first frequency portion.

In addition, as discussed above, the act of detecting the potential for interference on the second TDD carrier could also include determining that the second TDD carrier is adjacent in frequency to the first TDD carrier, determining that the second TDD carrier has the second TDD configuration different than the first TDD configuration, and/or determining that the second access node is proximate to the first access node (e.g., that the two are collocated or otherwise close enough for the presently addressed issue to arise).

Further, as discussed above, either or each of the first TDD configuration of the first TDD carrier or the second TDD configuration of the second TDD carrier could be dynamically configured and/or could be statically configured. And in either case, the second TDD configuration could define a second sequence of uplink and downlink time intervals, and the act of determining that there is the at least one time interval in which the second TDD carrier is uplink concurrently with the first TDD carrier being downlink could involve comparing the first sequence with the second sequence.

Still further, as discussed above, the first TDD carrier could be divided over the first frequency range into PRBs, and the second carrier could have a second frequency range. And in that case, the first frequency portion of the first TDD carrier closest in frequency to the second TDD carrier could be a first one or more of the PRBs selected based on the one or more PRBs being closest in frequency to the second frequency range of the second TDD carrier, and the second frequency portion of the first TDD carrier could include a second one or more of the PRBs farther away in frequency than the first one or more PRBs from the second frequency range of the second TDD carrier.

And yet further, the first access node and second access node could be collocated and/or operated by a common wireless service provider, perhaps with one operating on one radio access technology and the other operating on a different radio access technology. Or the first access node and the second access node could be operated by different respective wireless service providers.

Figure 6:
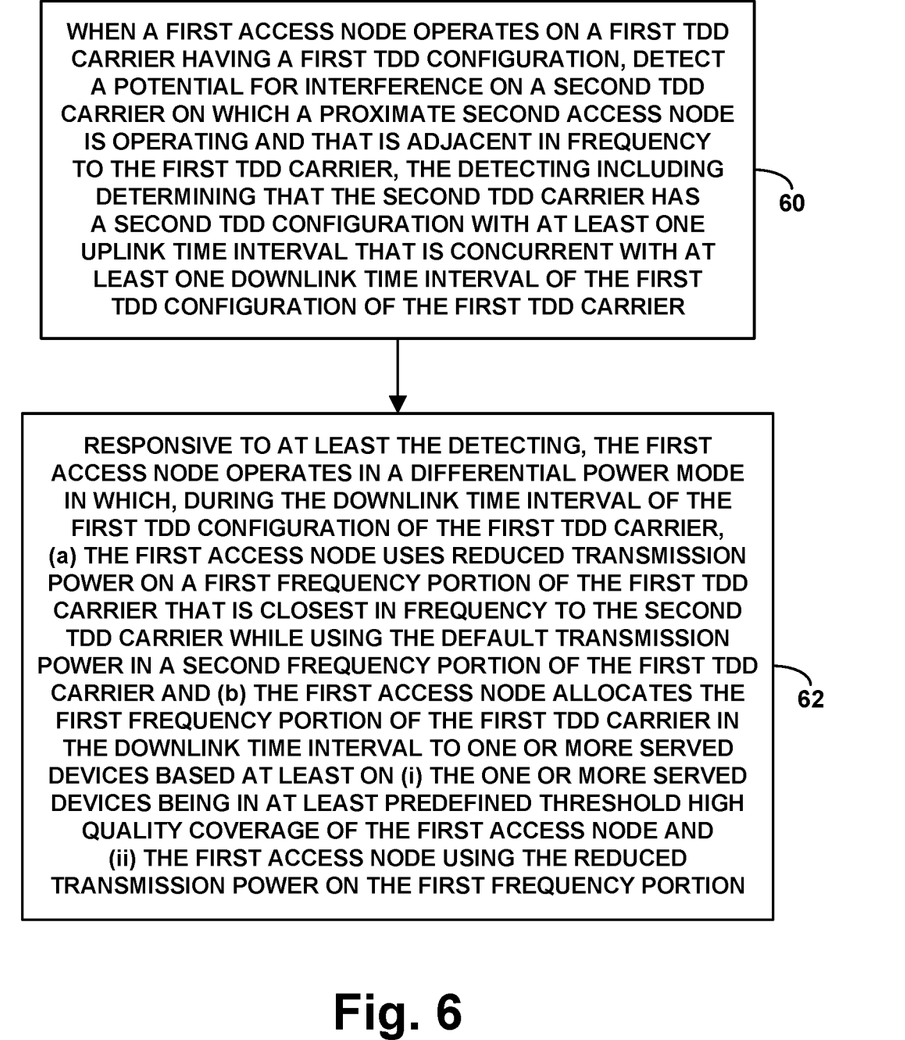
FIG. 6 is another flow chart depicting an example method in accordance with the disclosure.

FIG. 6 is another flow chart depicting a method that could be carried out in accordance with the present disclosure to control transmission by a first access node on a first TDD carrier having a first frequency range and having a first TDD configuration that defines a first sequence of uplink and downlink time intervals, where the first access node is configured to transmit with a default transmission power.

As shown in FIG. 6, at block 60, the method includes detecting a potential for interference on a second TDD carrier on which a proximate second access node is operating and that is adjacent in frequency to the first TDD carrier, the detecting including determining that the second TDD carrier has a second TDD configuration with at least one uplink time interval that is concurrent with at least one downlink time interval of the first TDD configuration of the first TDD carrier.

At block 62, the method then includes, responsive to at least the detecting, the first access node operating in a differential power mode in which, during the downlink time interval of the first TDD configuration of the first TDD carrier, (a) the first access node uses reduced transmission power on a first frequency portion of the first TDD carrier that is closest in frequency to the second TDD carrier while using the default transmission power in a second frequency portion of the first TDD carrier and (b) the first access node allocates the first frequency portion of the first TDD carrier in the downlink time interval to one or more served devices based at least on (i) the one or more served devices being in at least predefined threshold high quality coverage of the first access node and (ii) the first access node using the reduced transmission power on the first frequency portion.

Various features described above can be implemented in this context, and vice versa.

For example, the act of detecting the potential for interference on the second TDD carrier could include determining that the second TDD carrier is adjacent in frequency to the first TDD carrier and that the second access node is proximate to the first access node.

Further, the act of determining that the second TDD carrier has the second TDD configuration with the at least one uplink time interval that is concurrent with the at least one downlink time interval of the first TDD configuration of the first TDD carrier could involve determining that the at least one uplink time interval of the second TDD configuration is concurrent with the at least downlink time interval of the first TDD configuration. For instance, the second TDD configuration could define a second sequence of uplink and downlink time intervals, and determining that the at least one uplink time interval of the second TDD configuration is concurrent with the at least downlink time interval of the first TDD configuration could involve comparing the first sequence with the second sequence.

Still further, the act of determining that the second TDD carrier has the second TDD configuration could be based on reference to neighbor data and/or based on monitoring of transmission from the second access node.

And as discussed above, the first TDD carrier could be divided over the first frequency range into PRBs, the second carrier could have a second frequency range, the first frequency portion of the first TDD carrier closest in frequency to the second TDD carrier could be one or more of the PRBs closest in frequency to the second frequency range of the second TDD carrier, and the second frequency portion could include one or more of the PRBs farther away in frequency from the second frequency range of the second TDD carrier.

Figure 7:
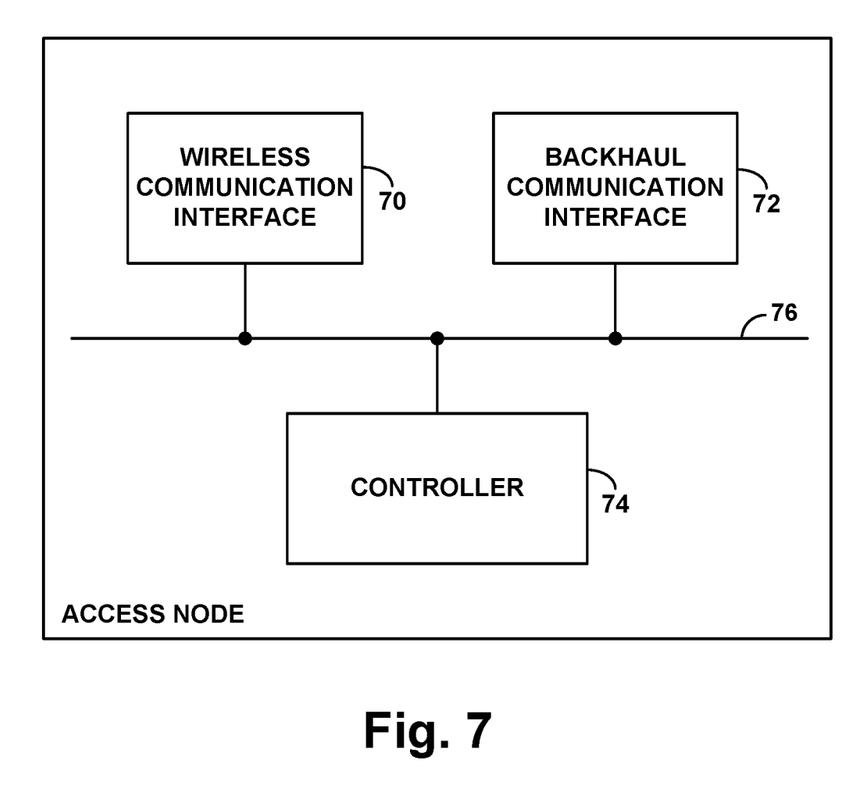
FIG. 7 is a simplified block diagram of an example access node operable in accordance with the disclosure.

FIG. 7 is a simplified block diagram of an example first access node, such as 4G eNB 12, showing some of the components that could be included in the access node in a non-limiting example implementation. As shown, the example first access node includes a wireless communication interface 70, a backhaul communication interface 72, and a controller 74, which could be integrated together in various ways (e.g., on a chipset) and/or interconnected by a system bus, network, or other communication mechanism 76 as shown.

The wireless communication interface 70 could include a transceiver configured to serve UEs in accordance with one or more radio access technologies and could comprise one or more radios, amplifiers, and RF filters, as well as an antenna structure for transmitting and receiving. Through the wireless communication interface 70, the first access node could engage in air-interface communication operating on a first TDD carrier having a first frequency range and having a first TDD configuration that defines a first sequence of uplink and downlink time intervals as discussed above.

The backhaul communication interface 72 could then comprise a wired or wireless network communication module, such as an Ethernet interface, through which to communicate with other entities, perhaps with the second access node and/or with one or more other entities on or via a core network.

Further, the controller 74 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to carry out, or cause the access node to carry out, various operations as described herein.

Various features discussed above can be implemented in this context, and vice versa.

Further, the present disclosure also contemplates a non-transitory computer-readable medium having encoded thereon (e.g., storing, embodying, containing, or otherwise incorporating) program instructions executable to cause a processing unit to carry out operations such as those described above.

Exemplary embodiments have been described above. Those skilled in the art will understand, however, that changes and modifications may be made to these embodiments without departing from the true scope and spirit of the invention.

We claim:

1. A method to control transmission in a first coverage area on a first time division duplex (TDD) carrier having a first frequency range and having a first TDD configuration that defines a first sequence of uplink and downlink time intervals, the method comprising:
   detecting, by one or more computing devices, a potential for interference on a second TDD carrier on which a second coverage area operates, wherein the second TDD carrier is adjacent in frequency to the first TDD carrier and has a second TDD configuration different than the first TDD configuration, wherein the detecting includes determining that there is at least one time interval in which the second TDD carrier is uplink concurrently with the first TDD carrier being downlink; and
   responsive to at least the detecting, operating, by the one or more computing devices, in a differential power mode during the determined time interval, including using a first transmission power on a first frequency portion of the first TDD carrier that is closest in frequency to the second TDD carrier while using a second transmission power on a second frequency portion of the first TDD carrier that is farther away in frequency from the second TDD carrier, the first transmission power being lower than the second transmission power.

2. The method of claim 1, wherein the detecting further includes determining that the second TDD carrier is adjacent in frequency to the first TDD carrier and determining that the second TDD carrier has the second TDD configuration different than the first TDD configuration.

3. The method of claim 1, wherein at least one of the first TDD configuration of the first TDD carrier or the second TDD configuration of the second TDD carrier is dynamically configured.

4. The method of claim 1, wherein the second TDD configuration defines a second sequence of uplink and downlink time intervals, and wherein determining that there is the at least one time interval in which the second TDD carrier is uplink concurrently with the first TDD carrier being downlink comprises:
comparing the first sequence with the second sequence.

5. The method of claim 1,
wherein the first TDD earner 1s divided over the first frequency range into physical resource blocks (PRBs),
wherein the second TDD carrier has a second frequency range,
wherein the first frequency portion of the first TDD carrier closest in frequency to the second TDD carrier is one or more of the PRBs closest in frequency to the second frequency range of the second TDD carrier, and
wherein the second frequency portion of the first TDD carrier comprises one or more of the PRBs farther away in frequency from the second frequency range of the second TDD carrier.

6. The method of claim 1, wherein the first coverage area and second coverage area are provided by a common wireless service provider.

7. The method of claim 1, wherein the first coverage area and second coverage areas are provided by different respective wireless service providers.

8. A method to control transmission by an access node on a first time division duplex (TDD) carrier having a first frequency range and having a first TDD configuration that defines a first sequence of uplink and downlink time intervals, wherein the access node is configured to transmit with a default transmission power, the method comprising:
detecting, by the access node, a potential for interference on a second TDD carrier that 1s adjacent in frequency to the first TDD carrier, wherein the detecting includes determining that the second TDD carrier has a second TDD configuration with at least one uplink time interval that is concurrent with at least one downlink time interval of the first TDD configuration of the first TDD carrier; and
responsive to at least the detecting, operating by the access node in a differential power mode in which, during the downlink time interval of the first TDD configuration of the first TDD carrier, the access node uses reduced transmission power on a first frequency portion of the first TDD carrier that is closest in frequency to the second TDD carrier while using the default transmission power in a second frequency portion of the first TDD carrier.

9. The method of claim 8, wherein determining that the second TDD carrier has the second TDD configuration with the at least one uplink time interval that is concurrent with the at least one downlink time interval of the first TDD configuration of the first TDD carrier comprises:
determining that the at least one uplink time interval of the second TDD configuration is concurrent with the at least downlink time interval of the first TDD configuration.

10. The method of claim 9, wherein the second TDD configuration defines a second sequence of uplink and downlink time intervals, and wherein determining that the at least one uplink time interval of the second TDD configuration is concurrent with the at least downlink time interval of the first TDD configuration comprises:
comparing the first sequence with the second sequence.

11. The method of claim 8, wherein determining that the second TDD carrier has the second TDD configuration is based on reference to neighbor data.

12. The method of claim 8, wherein determining that the second TDD carrier has the second TDD configuration is based on monitoring of transmission on the second TDD carrier.

13. The method of claim 8,
wherein the first TDD earner 1s divided over the first frequency range into physical resource blocks (PRBs),
wherein the second TDD carrier has a second frequency range,
wherein the first frequency portion of the first TDD carrier closest in frequency to the second TDD carrier is one or more of the PRBs closest in frequency to the second frequency range of the second TDD carrier, and
wherein the second frequency portion comprises one or more of the PRBs farther away in frequency from the second frequency range of the second TDD carrier.

14. An access node comprising:
a wireless communication interface through which the access node engages in air-interface communication operating on a first time division duplex (TDD) carrier having a first frequency range and having a first TDD configuration that defines a first sequence of uplink and downlink time intervals;
a backhaul communication interface; and
a controller configured to control transmission by a access node on the first TDD carrier,
wherein the controller is configured to detect a potential for interference on a second TDD carrier, wherein the second TDD carrier is adjacent in frequency to the first TDD carrier and has a second TDD configuration different than the first TDD configuration, wherein the detecting includes determining that there is at least one time interval in which the second TDD carrier is uplink concurrently with the first TDD carrier being downlink, and
wherein the controller is configured to respond to at least the detecting by causing the access node to operate in a differential power mode during the determined time interval, wherein, in the differential power mode, the access node uses a first transmission power on a first frequency portion of the first TDD carrier that is closest in frequency to the second TDD carrier while using a second transmission power on a second frequency portion of the first TDD carrier that is farther away in frequency from the second TDD carrier, the first transmission power being lower than the second transmission power.

15. The method of claim 14, wherein the detecting further includes determining that the second TDD carrier is adjacent in frequency to the first TDD carrier and determining that the second TDD carrier has the second TDD configuration different than the first TDD configuration.

16. The method of claim 14, wherein at least one of the first TDD configuration of the first TDD carrier or the second TDD configuration of the second TDD carrier is dynamically configured.

17. The method of claim 14, wherein the second TDD configuration defines a second sequence of uplink and downlink time intervals, and wherein determining that there is the at least one time interval in which the second TDD carrier is uplink concurrently with the first TDD carrier being downlink comprises:
comparing the first sequence with the second sequence.

18. The method of claim 14,
wherein the first TDD earner 1s divided over the first frequency range into physical resource blocks (PRBs), wherein the second TDD carrier has a second frequency range, wherein the first frequency portion of the first TDD carrier closest in frequency to the second TDD carrier is one or more of the PRBs closest in frequency to the second frequency range of the second TDD carrier, and wherein the second frequency portion of the first TDD carrier comprises one or more of the PRBs farther away in frequency from the second frequency range of the second TDD carrier.

19. The method of claim 14, wherein the first coverage area and second coverage area are provided by a common wireless service provider.

20. The method of claim 14, wherein the controller comprises a processing unit, non-transitory data storage, and program instructions stored in the non-transitory data storage and executable by the processing unit to carry out the detecting and responding.

* * * * *